US007513333B2

(12) United States Patent
Davis

(10) Patent No.: US 7,513,333 B2
(45) Date of Patent: Apr. 7, 2009

(54) SELECTIVELY LIFTABLE PLATFORM MECHANISM, AND METHOD FOR ERECTING A SHOOTING HOUSE

(75) Inventor: Kenneth Davis, 436 SCR 84-A, Bay Spring, MS (US) 39422

(73) Assignee: Kenneth Davis, Bay Springs, MI (US)

( * ) Notice: Subject to any disclaimer, the term of this patent is extended or adjusted under 35 U.S.C. 154(b) by 704 days.

(21) Appl. No.: 11/133,868

(22) Filed: May 20, 2005

(65) Prior Publication Data

US 2006/0260871 A1 Nov. 23, 2006

(51) Int. Cl.
*A01M 31/02* (2006.01)

(52) U.S. Cl. .................... 182/63.1; 182/64.1; 182/69.6; 182/115

(58) Field of Classification Search ................ 182/63.1, 182/64.1, 69.5, 69.6, 115, 124; D25/62
See application file for complete search history.

(56) References Cited

U.S. PATENT DOCUMENTS 1,947,647 A * 2/1934 Holden ....................... 182/141
2,781,236 A * 2/1957 Becker et al. ................. 414/11
3,464,519 A * 9/1969 Whisler ...................... 182/141
3,825,096 A * 7/1974 Mendes ....................... 182/86
4,335,803 A * 6/1982 Sugita ......................... 182/12
4,719,716 A 1/1988 Chrisley, Jr.
5,102,179 A 4/1992 Royer
5,295,555 A 3/1994 Strange
5,564,523 A 10/1996 Howard
6,435,801 B2 * 8/2002 Talbott ....................... 414/482
6,460,653 B1 * 10/2002 Hardy et al. ............... 182/63.1
6,523,641 B2 2/2003 Smith
6,637,549 B1 * 10/2003 Lopacki ...................... 182/127
6,739,428 B1 5/2004 Holmes et al.
7,320,382 B2 * 1/2008 Savoie et al. ................ 182/127

* cited by examiner

*Primary Examiner*—Alvin C Chin-Shue
*Assistant Examiner*—Colleen M Quinn
(74) *Attorney, Agent, or Firm*—Peter L. Brewer; Baker, Donelson, Bearman, Caldwell & Berkowitz, PC

(57) ABSTRACT

A selectively liftable platform mechanism is first provided. The platform mechanism generally includes a trailer, a platform, and a support structure on the trailer for pivotally raising the platform from a lowered position to an elevated position. The support structure includes a ladder having a distal end pivotally connected to the platform and a proximal end pivotally and slidably connected to the trailer. The proximal end of the ladder is movable along the longitudinal axis of the trailer in order to level and stabilize the platform into a viewing position. A method for erecting a shooting house is also provided. The shooting house is positioned onto the liftable platform mechanism.

8 Claims, 8 Drawing Sheets

SELECTIVELY LIFTABLE PLATFORM MECHANISM, AND METHOD FOR ERECTING A SHOOTING HOUSE

BACKGROUND OF THE INVENTION

1. Field of the Invention

The present invention relates to elevated platforms such as a hunting stand, a tree trimmer's platform or a band director's stand. Further, the invention relates to a shooting house that may be selectively raised to aid in viewing wildlife. The invention further relates to a method for erecting a shooting house so that the shooting house may be transported and selectively raised.

2. Description of the Related Art

Many individuals desire to observe wildlife or game in their natural habitat. Individuals may desire to observe wildlife either for photography, for hunting or for other means of recreation.

In order to observe wildlife, it is advantageous for one to elevate themselves so as to be removed from the immediate line of sight and scent of animals on the ground. One elevation mechanism that has been employed is a tree stand. Tree stands come in a variety of sizes and designs. The most common type of tree stand is one that is temporarily affixed to a single tree. Such tree stands have the advantage of being light weight, portable and relatively inexpensive. However, they are also confining, requiring the individual to either sit or stand in a single position and orientation for an extended period of time.

A more comfortable and practical elevation mechanism is the hunting stand. The hunting stand defines a small, free-standing, substantially enclosed house having one or more windows for viewing wildlife. The house is supported off of the ground by a support structure that may be eight or more feet tall. The house is accessed by scaling a ladder that extends up from the ground. While such hunting stands are more comfortable, they have the disadvantage of being large, heavy, fixed structures. This means that the hunter or photographer who wishes to view wildlife from more than one location must erect more than one stand or go to the considerable trouble of relocating the house and supporting structure.

Recently, various hunting stands have been disclosed that are portable. For example, U.S. Pat. No. 6,523,641 provides a hunting stand that is transported by a trailer. The hunting stand defines a platform that is raised at the end of a pivoting shaft. The shaft pivots from a lower horizontal position to an erected position on the trailer. The shaft is raised by actuating a telescoping base that extends in response to rotational movement of a lead screw. Lateral stabilizer arms are provided for the erected platform.

Various other portable hunting stands have been disclosed with different lifting mechanisms. U.S. Pat. No. 5,295,555 teaches a stand supported on a wheeled trailer. The shooting stand may be raised by actuating a pair of hydraulic cylinders. The cylinders cause a lift boom and supported shooting stand to be erected. Similarly, U.S. Pat. No. 6,460,653 provides a "hunting box" that is supported by a scissor support structure. The scissor support structure is raised by actuating an electric winch that acts on a plurality of pulleys. U.S. Pat. No. 6,739,428 provides a shooting stand that comprises a chair on a platform. The platform is rotated into its elevated position by actuating a winch to rotate a support structure into an upright position. The stand is transported by and actually positioned on an all-terrain vehicle.

The above disclosures generally require a number of expensive mechanical parts. For example, the stand of the '641 patent requires a lead screw for raising a telescoping shaft. U.S. Pat. No. 4,719,716 does provide a simpler model for raising a deer stand. The stand is raised by use of a cable and pulley that pivots support members from a lower horizontal position into a vertical position. However, a separate ladder must be provided to access the house.

Accordingly, a need remains for a liftable shooting house that employs a sturdy and mechanically straight-forward design for raising the house. Further, a need remains for an improved platform such as for a hunting stand that integrates the ladder into the support structure. A need also remains for a selectively liftable platform actuated by applying tension to a cable, and wherein the ladder is pulled into position so as to level the platform after it is raised.

SUMMARY OF THE INVENTION

A selectively liftable platform mechanism is provided. In one aspect, the platform mechanism includes a trailer; a support structure on the trailer; a winch frame connected to the trailer proximate a first end, the winch frame having a top pulley for receiving a cable; a platform connected to the support structure; and a winch. The support structure has at least one support bar having a proximal end pivotally connected to the trailer, and a distal end pivotally connected to the platform. It also has a ladder having a proximal end pivotally and slidably connected to the trailer, and a distal end pivotally connected to the platform. The ladder, thus, is part of the support structure. The winch is used to selectively apply tension to the cable through the top pulley such that application of tension in the cable causes the at least one support bar to rotate the platform from a lowered position to a raised position.

It is preferred that the platform be horizontal in both its lowered (transport) and raised (viewing) positions. The platform is accessed by the ladder after the proximal end of the ladder has been moved into place. In one aspect, the ladder is first elevated to a position where the ladder is at an angle of approximately 90° relative to the trailer, and then is pulled along the trailer until the platform is level. At that point, the proximal end of the ladder hits a stop member along the trailer.

In one aspect, the platform mechanism includes a shooting house connected to and supported by the platform.

A method of accessing an elevated platform is also provided. The method first includes providing a liftable platform mechanism. The mechanism generally includes a trailer, a platform, and a pivoting support structure for supporting the platform. The support structure has a ladder which has a proximal end pivotally and slidably movable along the trailer and a distal end pivotally connected to the platform. As a next step, the support structure is pivoted to raise the platform to an unlevel position. Then, the proximal end of the ladder is moved along the trailer so as to level the platform into a viewing position. Finally, an individual will climb the ladder in order to access the elevated and leveled platform.

The present inventions also include a method for erecting a platform. The method includes the steps of providing a selectively liftable platform mechanism that has a ladder as part of its support structure, and then sliding the proximal end of the ladder to engage a stop member, thereby limiting further longitudinal movement of the proximal end of the ladder and thereby leveling the platform into a viewing position. Preferably, the platform mechanism includes a trailer; a platform; a pivoting support structure on the trailer having at least one support bar having (1) a proximal end pivotally connected to the trailer proximate a first end, and a distal end pivotally connected to the platform, and (2) a ladder having a proximal end pivotally and slidably riding along the trailer and a distal end pivotally connected to the platform; a cable; and a winch for selectively applying tension to the cable. Application of tension to the cable causes the at least one support bar to rotate the platform from a lowered position to a raised position.

In one aspect, the platform mechanism also includes a shooting house supported by the platform. In one aspect, the liftable platform mechanism also includes a winch frame connected to the trailer proximate a first end, the winch frame having a horizontal rail and two vertical side bars. At least one pulley is placed on the horizontal rail for receiving the cable, and the winch is supported by one of the vertical side bars.

BRIEF DESCRIPTION OF THE DRAWINGS

So that the manner in which the above recited features of the present invention can be better understood, certain drawings are appended hereto. It is to be noted, however, that the appended drawings illustrate only selected embodiments of the inventions and are therefore not to be considered limiting of scope, for the inventions may admit to other equally effective embodiments and applications.

DETAILED DESCRIPTION

Definitions

As used herein, the term "shooting stand" refers to any elevated deer stand, photography stand or watch tower.

The term "shooting house" refers to any partially or fully enclosed structure.

The term "winch" includes both hand cranked winches and winches turned by an electric motor. Electricity may be provided by any means, including for example a vehicle battery, a dedicated battery and solar power.

The term "pivotally connected" means any operative connection by which one part may rotate relative to another. Direct attachment is not required; attachment may be through an intermediate bar or other object.

The term "stop member" means any detent or object which limits movement of another object.

DESCRIPTION OF SPECIFIC EMBODIMENTS

Figure 1A:
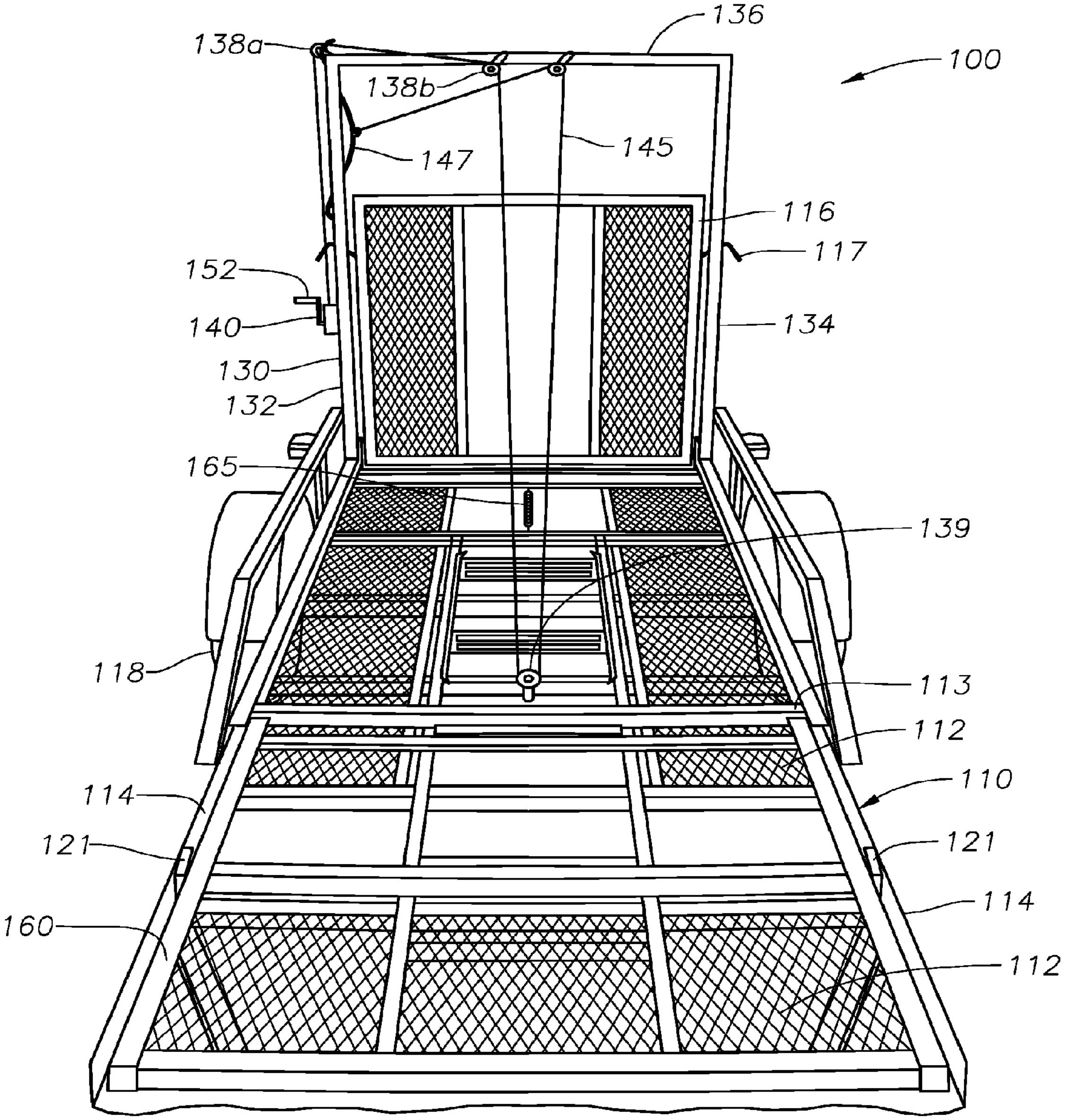
FIG. 1A presents a perspective view of the selectively liftable platform mechanism of the present invention, in one embodiment. The view is taken from the front of the trailer. In this view, the platform is in its lowered position.
Figure 1B:
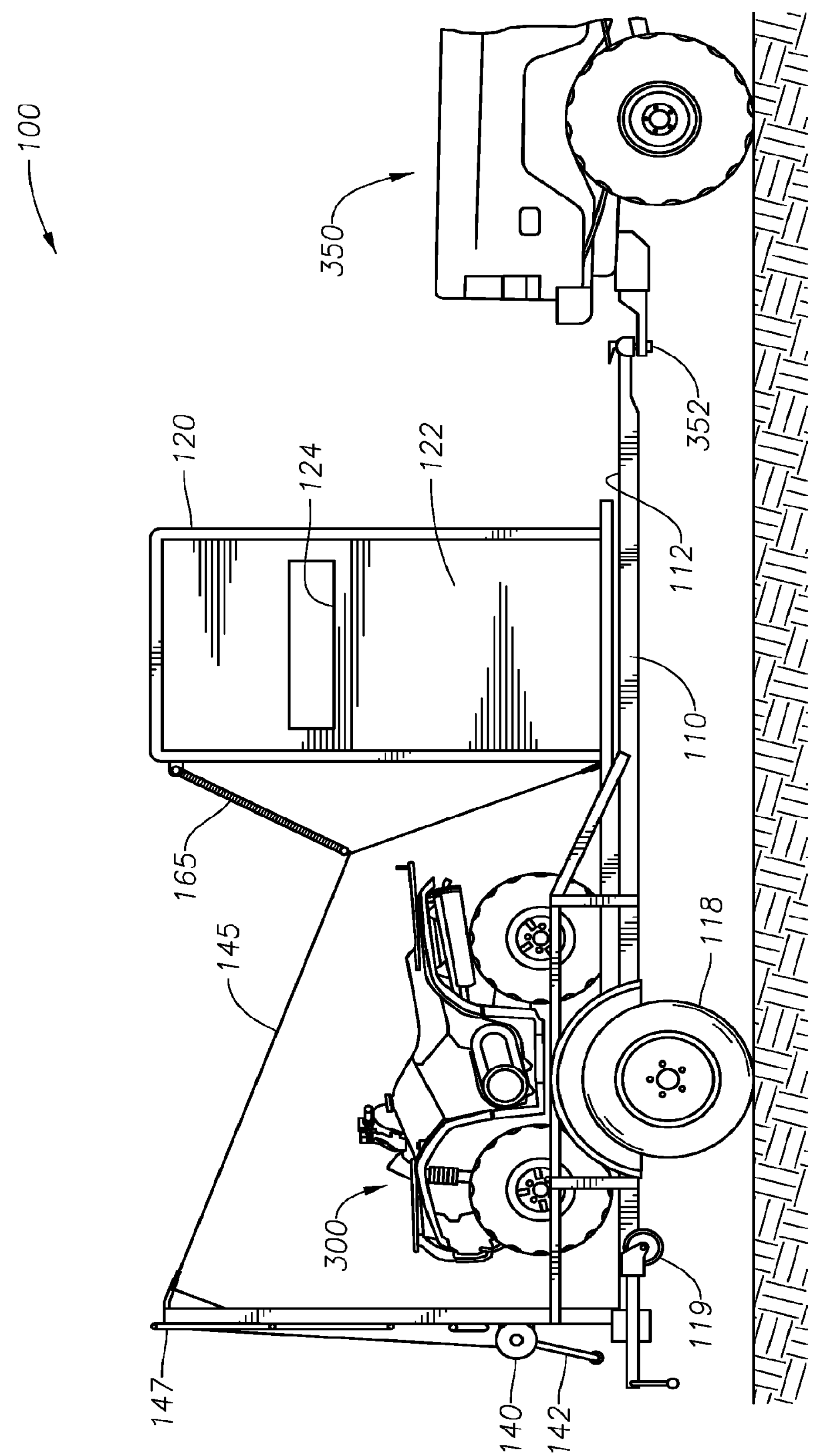
FIG. 1B shows a side view of the platform mechanism of FIG. 1A. In this view, the trailer is hitched to a pick-up truck. An all-terrain vehicle has been loaded onto the trailer. In addition, a shooting house has been placed onto the platform.

FIGS. 1A and 1B each show a selectively liftable platform mechanism 100 of the present invention, in one embodiment. FIG. 1A presents a perspective view of the platform mechanism 100, while FIG. 1B shows a side view of the platform mechanism 100. In FIG. 1A just the mechanism 100 is shown, or a substantial portion thereof, while in FIG. 1B an all-terrain vehicle ("ATV") 300 is positioned on the mechanism 100. Further, the mechanism 100 is hitched to a truck 350. Still further, in FIG. 1B a shooting house 120 has been added to the mechanism 100.

The selectively liftable platform mechanism 100 first includes a trailer 110. The trailer 110 has a bed 112 supported by opposing rails 114. A rear of the trailer 110 includes a ramp 116. The ramp 116 is pivotally connected to the rear of the trailer 110 by hinges (not shown). This allows the ramp 116 to be lowered so as to drive the ATV 300 onto or off of the bed 112 of the trailer 110. The ramp 116 is shown in its lowered state in FIG. 3. The loading ramp 116 may be folded down onto the ground when the trailer 110 is parked.

It is noted that the ramp 116 is shown in its vertical position in FIGS. 1A and 1B. The ramp 116 is locked into place by a locking bar 117. The ramp 116 is maintained in its raised position when the trailer 110 is being transported. Also, by raising the loading ramp 116, the ATV 300 is prevented from rolling off of the bed 112 of the trailer 110 during transit.

The trailer 110 is designed to be transported either over the road or off of the road. The front end of the trailer 110 has a hitch 352 for hitching to a truck, such as truck 350. The hitch 352 includes an adjustable stand (not shown) for supporting the front end of the trailer 110 when it is unhitched from the truck 350. The trailer 110 further has at least two road-worthy tires 118 supported by and turned with an axle (also not shown). Other optional features may be provided for the trailer 110 such as a spare tire (not shown), wheel covers (not numbered) and extendable outrigger jacks 119.

Figure 3:
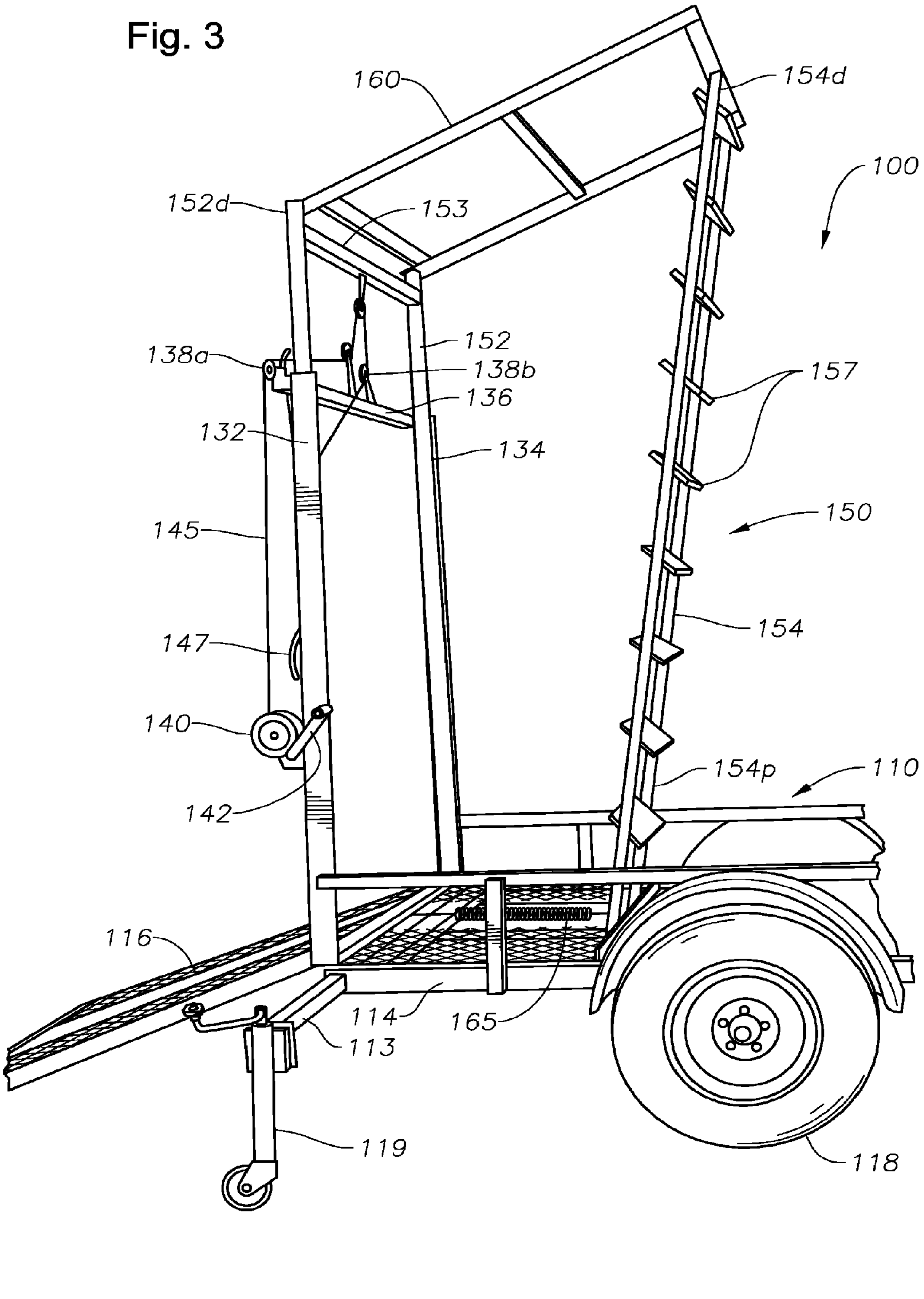
FIG. 3 presents another perspective view of the platform mechanism of FIG. 1A. Here, the support bar has been completely raised into a vertical position. The platform has been raised to its apex. However, it can be seen that the platform has not yet been leveled.

One of the outrigger jacks 119 is shown in FIG. 3. As can be seen, the jacks 119 extend from a transverse, horizontal bar 113 along the rear of the trailer 110. The jacks 119 may be rotated and locked into a position where they contact the ground. In this way, the outrigger jacks 119 provide additional lateral support for the platform mechanism 100 when the mechanism 100 is being raised.

The illustrative trailer 110 is preferably configured to support a shooting house. In the mechanism 100 of FIG. 1B, a shooting house has been added, shown at 120. The exemplary shooting house 120 has a floor (not seen), one or more side walls 122, and one or more windows 124 along the side walls 122. The walls 122 shield an individual within the house 120 from the line of sight and scent of animals, and from the winter elements, while the windows 124 permit the individual to view wildlife in its natural habitat. It is understood that the inclusion of the shooting house 120 is optional. Further, the shooting house 120 may be of any size or style so long as it can be affixed to the platform 110.

In accordance with the present invention, the platform mechanism 100 (and the optional shooting house 120 carried thereon) is designed to be elevated from a lowered position to a viewing position by an erection assembly. In the views of FIGS. 1A and 1B, the platform mechanism 100 is in its lowered position. This means that the shooting house 120 is resting on the trailer 110, preferably in a level state. This is also the transport position for the platform mechanism 100.

Figure 2:
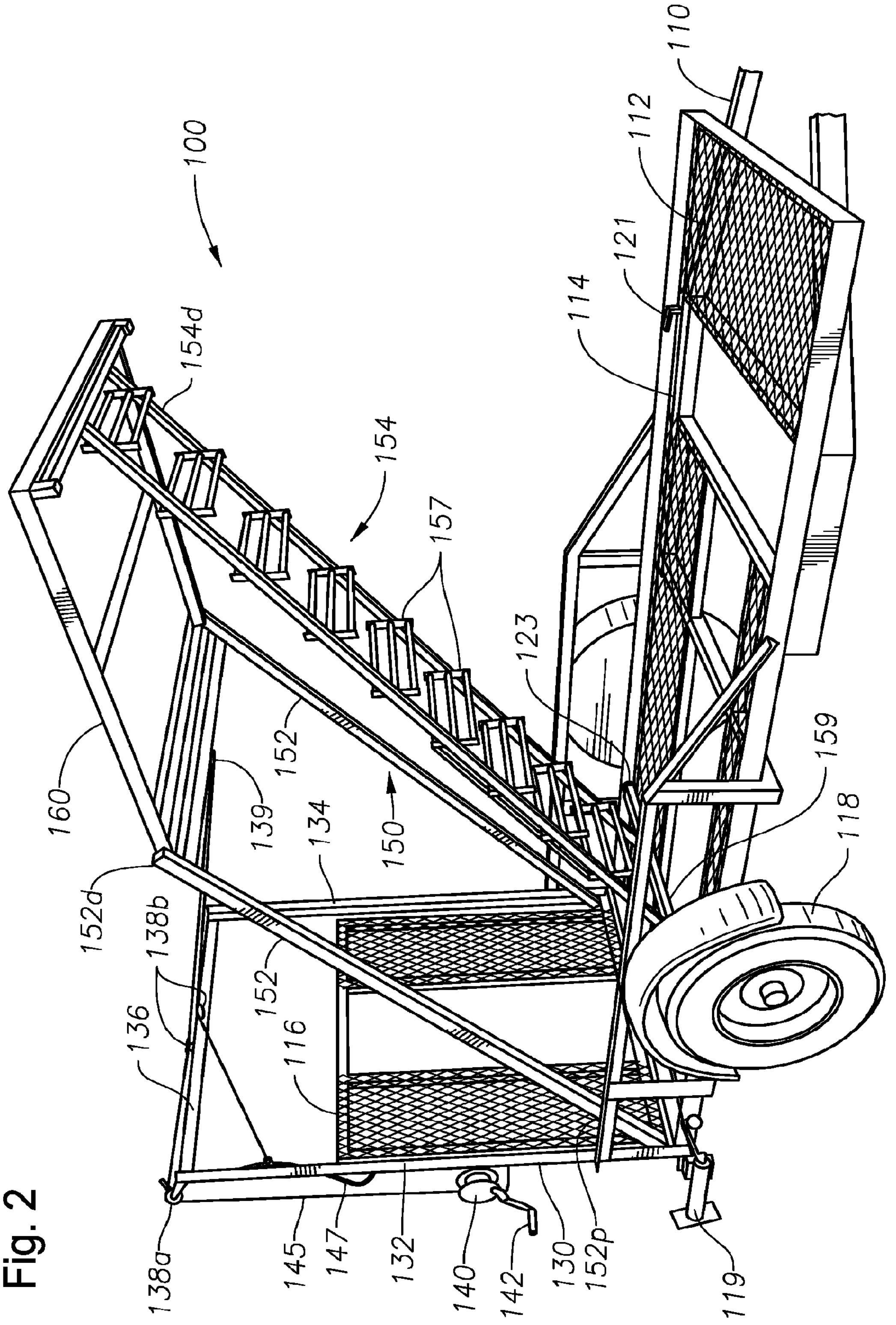
FIG. 2 is a perspective view of the platform mechanism of FIG. 1A. In this view, tension has been applied through the cable in order to rotate the support bars and connected platform off of the trailer.

FIG. 2 presents another perspective view of the vertically adjustable platform mechanism 100 of FIG. 1A. In this view, the platform mechanism 100 is being raised. An erection assembly having a winch 140 and a cable 145 is gainfully used to raise the platform mechanism 100. The winch 140 includes a spool for winding the cable 145. The winch 140 may be either manually cranked or automatically cranked to wind or unwind the cable 145. Preferably, the winch 140 is manually cranked to reduce cost and to ensure that the mechanism 100 may be raised and lowered without reliance upon a power source in a remote location. In this arrangement, the winch 140 includes a handle 142 for turning the spool and winding or unwinding the cable 145. In one aspect, the cable 145 is 30 feet in length. In one aspect, the cable 145 is 3/16 inch to 3/8 inch gauge, and rated from 1,700 to 3,600 pounds.

Figure 6:
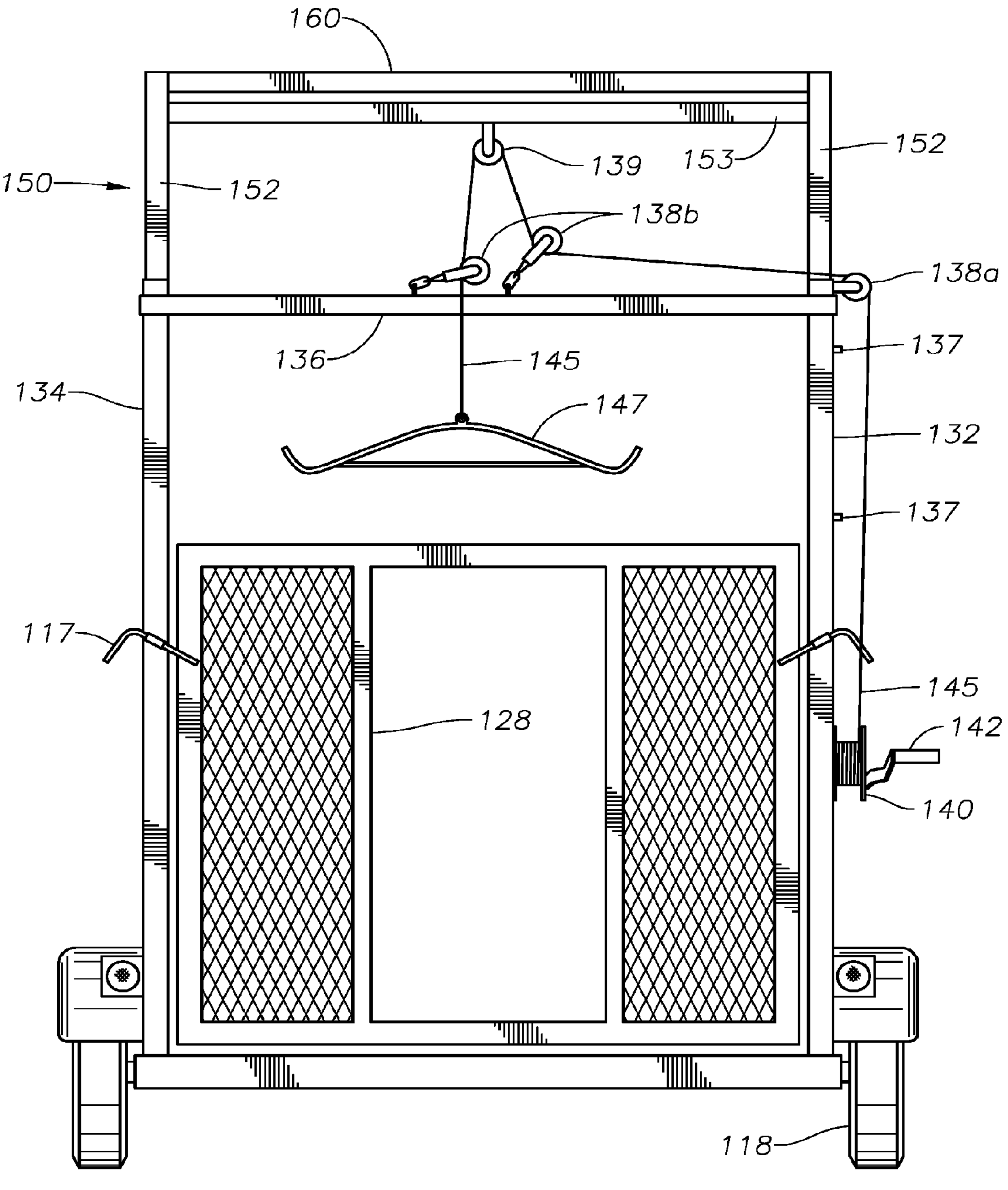
FIG. 6 provides an enlarged rear view of the pulley system for the platform mechanism, in one embodiment.

The winch 140 is supported by a vertically oriented winch frame 130 which is part of the erection assembly. The winch frame 130 is positioned proximate the rear of the trailer 110. In the illustrative arrangement of FIG. 2, the winch frame 130 has two vertical side bars 132, 134 and a connecting horizontal rail 136. The winch frame 130 also includes at least one pulley. In the arrangement of FIG. 2, a side pulley 138*a* and two top pulleys 138*b* are used. The side pulley 138*a* is connected to side bar 132, while the top pulleys 138*b* are connected to the horizontal rail 136. FIG. 6 provides an enlarged rear view of the pulley system for the platform mechanism 100, in one embodiment. The side pulley alone the vertical side bar 132 and the two top pulleys 138*b* along the horizontal rail 136 are more clearly seen. In addition, a fourth pulley 139 (discussed further below) is also seen.

The platform mechanism 100 next includes a platform 160. The platform 160 defines a planar body made up of one or more frames. A bed (not shown) may optionally be provided in the platform 160 to allow an individual to stand on the platform. The bed may be a wire mesh, a sheet of plywood, or other material. Preferably, however, the platform 160 receives and supports the shooting house 120.

The platform 160 is supported by a pivoting supporting structure 150. The support structure 150 has at least one, and preferably a pair of parallel, support bars 152. Each support bar 152 has a proximal end 152*p* pivotally connected to the trailer 110 near the winch frame 130, and a distal end 152*d* pivotally connected to the platform 160. A transverse bar 153 may optionally be provided at the distal ends 152*d* of the support bars 152 for additional support. In the arrangement of FIG. 2, the cable 154 runs through a pulley 139 connected to the transverse bar 153. In this manner, application of tension to the cable 145 by turning the winch 140 causes the distal end 152*d* of the support bars 152 to be rotated upwards.

The support structure 150 also includes a ladder 154. In the present arrangement, the step ladder 154 serves a novel role in providing structural support for the elevated platform 160. As with the support bars 154, the ladder 154 has a proximal end 154*p*. In the case of the ladder 154, the proximal end 154*p* is both pivotally and slidably movable along the trailer 110. The ladder 154 also has a distal end 154*d* pivotally connected to the platform 160. Longitudinal movement of the proximal end 154*p* of the ladder 154 is limited by stop members, such as stop member 121 discussed below in connection with FIG. 5.

As noted, the support structure 150 is normally maintained in a lowered, or "transport," position relative to the trailer 110. In order to raise the platform 160 into a viewing position, the winch 140 is turned in order to apply tension to the cable 145. As the winch 140 is turned, the support bars 152 are raised to an angle of approximately 45° relative to the trailer 110. FIG. 2 presents a perspective view of the platform mechanism of FIG. 1A in its intermediate position. It can be seen that the platform 160 is being raised. In one aspect, the platform 160 is now raised to a height of approximately 8 feet above the trailer 110.

As the winch 140 is further turned, the support bars 152 and the ladder 154 are each raised to an angle of approximately 90° relative to the trailer 110. The ladder 154 is configured to be longer than the support bars 152. This causes the platform 160 to be in a tilted or unlevel position relative to the trailer 110. FIG. 3 shows the platform mechanism 100 of FIG. 2 being further raised. Here, the platform 160 is at its apex. It can be seen that the platform 160 is not yet leveled.

In order to level the platform 160, the proximal end 154*p* of the ladder 154 is moved along the longitudinal rails 114 of the trailer 110. To aid in the support and movement of the proximal end 154*p* of the ladder 154, a transverse bar 159 is welded to the proximal end 154*p* of the ladder 154. Wheels 123 are optionally secured to each end of the transverse bar 159. The wheels 123 ride along the longitudinal frame 114 of the trailer 110. Longitudinal movement of the proximal end 154*p* of the ladder 154 and connected transverse bar 159 will cause the wheels 123 to roll and the transverse bar 159 to pivot.

Figure 5:
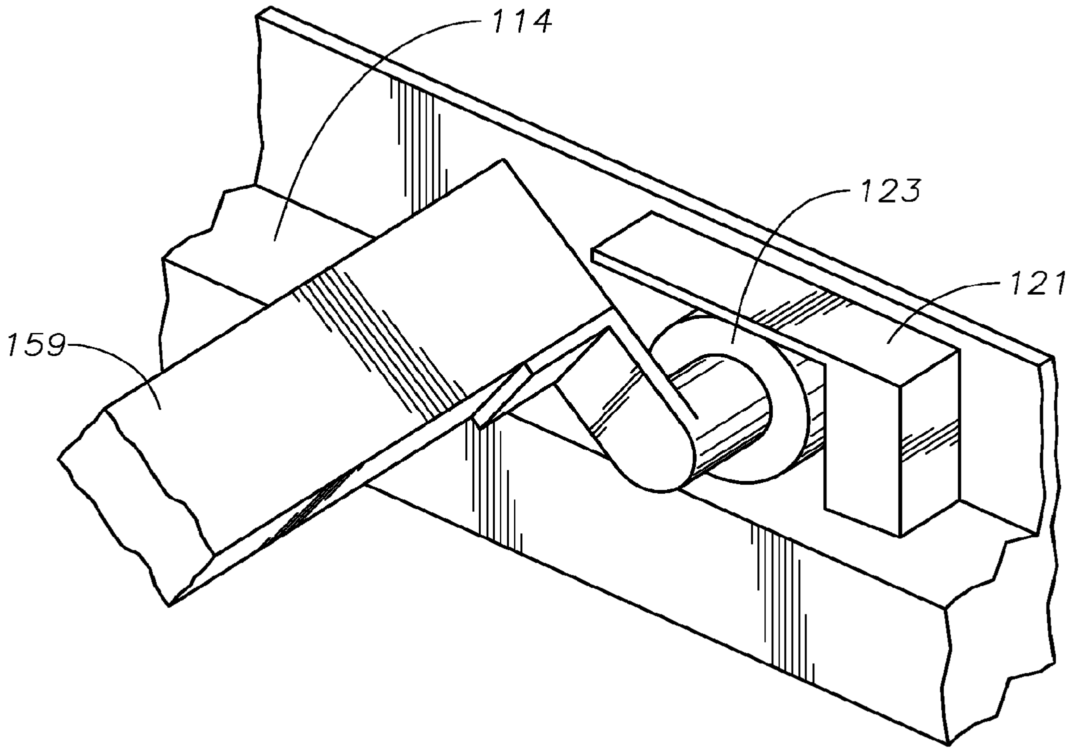
FIG. 5 provides an enlarged perspective view of one of the radial ends of the transverse bar on the proximal end of the ladder. The end is abutted against a stop member on the trailer.

FIG. 5 provides an enlarged perspective view of one of the wheels 123 abutted against a stop member 121 on the trailer 110. The stop member 121 prevents the ladder 154 from sliding too far along the trailer 110. Preferably, the stop member 121 defines both rear and top bars welded along the frame 114 to prevent both further longitudinal and vertical movement of the ladder 154.

Referring again to the cable 145, a first end of the cable 145 is spooled about the winch 140. From there, the cable runs through the side pulley 138*a*, and then through one of the top pulleys 138*b*. From there, the cable 145 runs through a frame pulley 139 at the distal end 152*d* of the support bars 152, and then back to the other to top pulley 138*b*. The winch frame 130 remains in an erected position regardless of the position of the platform 160. The end of the cable 145 is then secured to the rear of the trailer 110 during movement of the platform 160. It is understood that other pulley arrangements may be employed. For example, only one top pulley 138*b* could be used, with the end of the cable 145 being attached to the horizontal rail 136 of the winch frame 130.

Figure 4A:
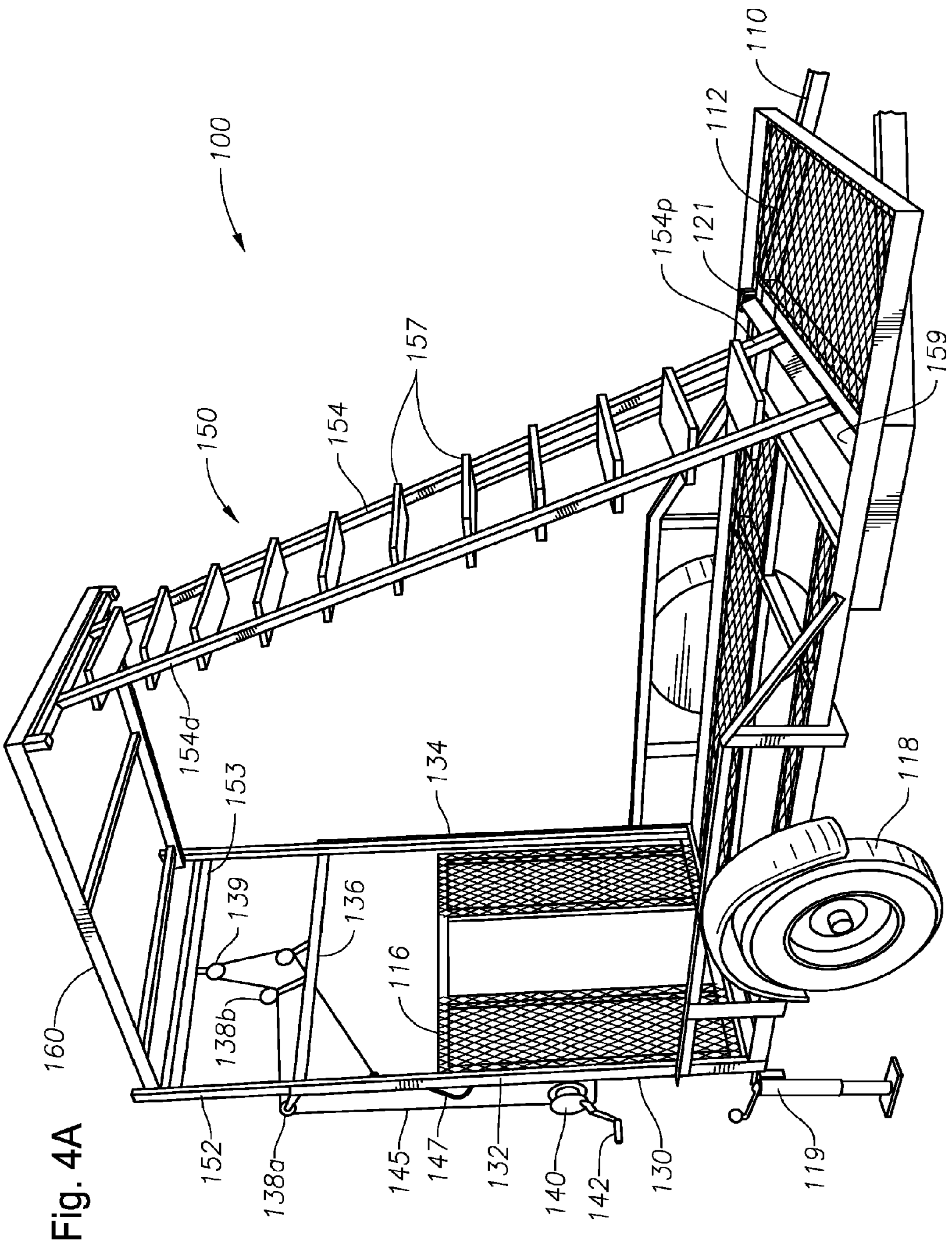
FIG. 4A demonstrates the platform mechanism in its viewing position. Here, the proximal end of the ladder has been pulled into position against a stop member on the trailer. The platform is now level.

FIG. 4A demonstrates the platform mechanism 100 with the platform 160 in its viewing position. Here, the proximal end 154*p* of the ladder 154 has been pulled into position against the stop member 121 on the trailer 110. This provides a safe angle of ascent and descent for an individual who traverses up and down the ladder 154. The ladder 154 includes a plurality of steps 157 that are oriented in horizontal arrangement when the ladder 154 is pulled against the stop members 121. In this position, the platform 160 is now level. The outrigger jacks 119 have been moved into place to provide lateral support to the trailer 110.

Figure 4B:
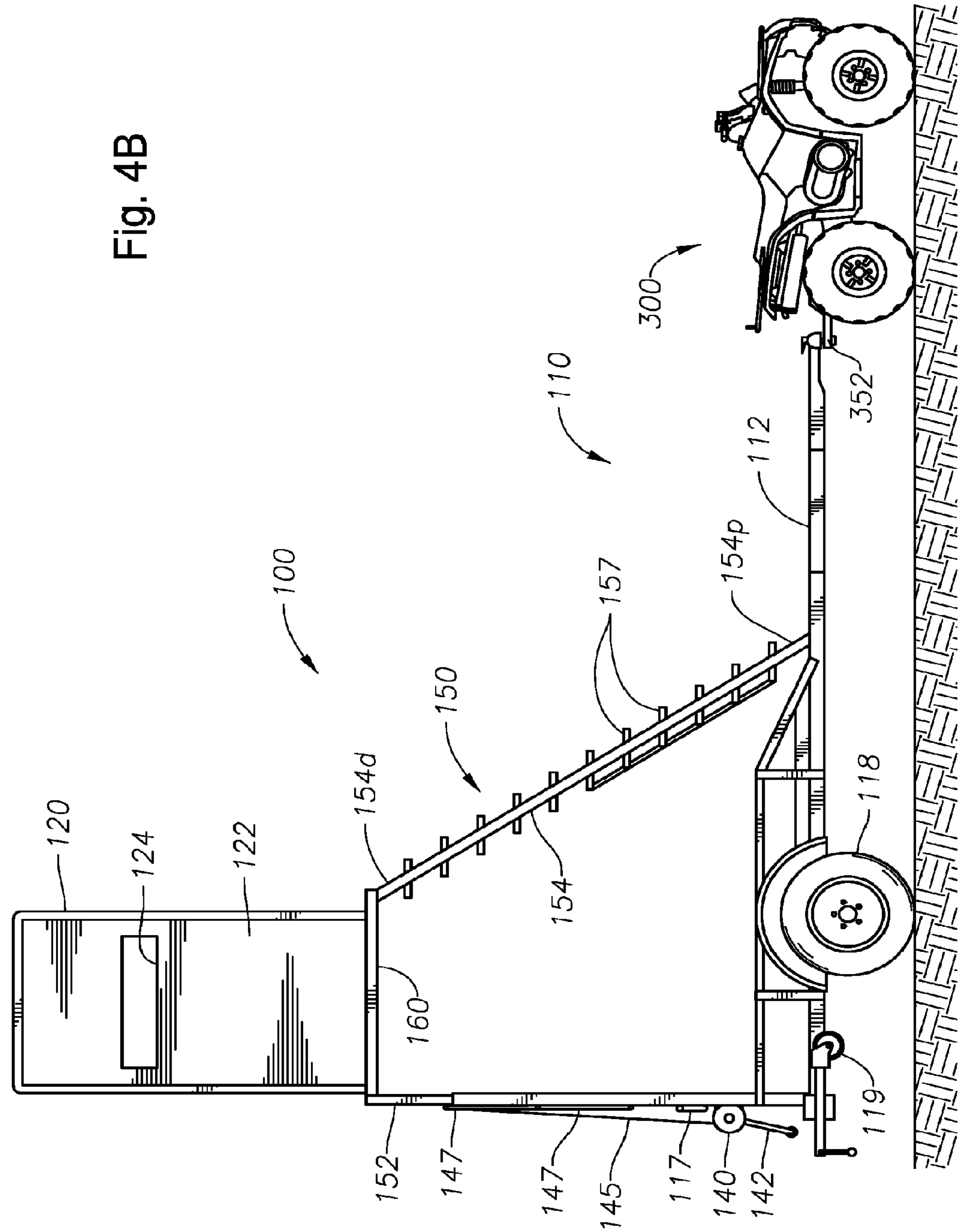
FIG. 4B shows a side view of the platform mechanism of FIG. 4A. However, in this view the platform mechanism includes a shooting house. In addition, the trailer has been hitched to an ATV.

FIG. 4B shows a side view of the platform mechanism 100 of FIG. 4A. However, in this view the platform mechanism again includes the shooting house 120. In addition, the ATV 300 is hitched to the trailer 110. The ATV 300 may move the trailer 110 off-road, although it is preferred that the platform 160 be returned to its lowered position before off-road movement. It is also preferred that the trailer 110 be hitched to a pick-up or other truck 350 when the platform 160 is in its raised position. This provides added stability to the platform mechanism 100.

It is understood that the platform mechanism 100 may be fabricated to be of sufficient size to increase the elevation of the platform 160. In this instance, the platform mechanism 100 might serve as a watch tower at a sporting event, or as a director's perch to supervise a band or a drill team, or even as an elevational platform for a worker such as a painter or tree trimmer.

An optional feature of the platform mechanism is a platform spring 165. The platform spring 165 is shown in the view of FIG. 1B. This is the view that has the ATV 300 on the trailer 110. The platform spring 165 connects the platform 160 (or shooting house 120 on the platform 160) to the cable 145. The platform spring 165 pulls the cable 145 vertically upward, thereby providing clearance for the ATV 300 to be positioned on the trailer 120.

A separate ladder spring 165 may optionally be employed along the trailer 110. The ladder spring 165 runs from the rear of the trailer 110 to the proximal end 154*p* of the ladder 154. The ladder spring 165 is in tension, and provides a bias to the proximal end 154*p* of the ladder 154 so as to aid in moving the proximal end 154*p* of the ladder 154 back towards the rear of the trailer 110 when it is time to lower the platform 160.

A method of accessing an elevated platform is also provided herein. In one form, the method includes a first step of providing a liftable platform mechanism. The mechanism generally includes a trailer, a platform, and a pivoting support structure. The pivoting support structure 150 has a ladder 154 as described above. In this respect, the ladder 154 has a proximal end 154*p* pivotally and slidably movable along the trailer 110 and a distal end 154*d* pivotally connected to the platform 160.

Next, the support structure 150 is pivoted in order to raise the platform 160 to an unlevel position. In order to level the platform 160, the proximal end 154*p* of the ladder 154 is moved along the trailer 160 into abutting position with a stop member 121. Thereafter, an individual may ascend the ladder 154 and enter the elevated platform 160.

The platform 160 may include a shooting house 120. In this instance, the individual who climbs the ladder 154 accesses the shooting house 120. From there, the individual may photograph, shoot at or otherwise watch for wildlife such as deer.

Another method for erecting a platform is provided. The method involves the use of a liftable platform mechanism. In one embodiment, the method comprises a step of providing a liftable platform mechanism such as the mechanism 100 shown in FIGS. 1A, 2, 3 and 4A. As noted, the mechanism 100 generally comprises a trailer 110 and a platform 160 supported by a pivoting support structure 150. The support structure 150 may include at least one support bar 152 having a proximal end 152*p* pivotally connected to the trailer 110, and a distal end 152*d* pivotally connected to the platform 160. The support structure 150 may further include a ladder 154 having a proximal end 154*p* pivotally and slidably movable along the trailer 110, and a distal end 154*d* pivotally connected to the platform 160. The mechanism further includes a cable 145 operatively connected to the platform 160 such as through a connection with the distal end 152*d* of the at least one support bar 152.

The support structure 150 is normally maintained in a transport position along the trailer 110. This places the platform 160 in its lowered position. In order to raise the platform 160 into a viewing position, a winch 140 is turned in order to apply tension to the cable 145. As the winch 140 is turned, the support bars 152 are raised to an angle of approximately 45° relative to the trailer 110. In one aspect, the platform 160 is now raised to a height of approximately 8 feet above the trailer 110. As the winch 140 is further turned, the support bars 152 and the ladder 154 are each raised to an angle of approximately 90° relative to the trailer 110. Because the ladder 154 is longer than the support bars 152, the platform 160 is tilted relative to the trailer 110.

In order to level the platform 160, the proximal end l54*p* of the ladder 154 is moved along the trailer 110 towards the front of the trailer 110 until it engages a stop member 121. At this point, the platform 160 is substantially horizontal and is in a viewing position. Because the ladder 154 is at an acute angle relative to the trailer 110, the ladder 154 is stable when the platform 160 is in its viewing position (see FIG. 4A.)

It is noted that when a shooting house 120 is on the platform 160 (see FIG. 4B), it may be difficult to push the proximal end l54*p* of the ladder 154 back towards the rear of the trailer 110 and refold the support structure 150. Therefore, the ladder spring 165 may again be provided along the proximal end l54*p* of the ladder 154. The spring 165 is in tension, and aids the user in pushing the proximal end l54*p* of the ladder 154 back towards the rear of the trailer 110. The spring 165 is seen in FIGS. 1A and 3.

As noted, the trailer 110 is preferably dimensioned and configured to receive and transport an all-terrain vehicle, such as vehicle 300. In one aspect, the method includes the step of removing the ATV from the trailer 110, and then hitching the ATV 300 to the trailer 110 at its front end before elevating the platform 160. The platform mechanism 100 may then be transported off-road by the ATV 300.

As also noted, the platform mechanism 100 may also include a shooting house, such as house 120 of FIG. 1B. The platform mechanism 100 may further include a gambrel 147. The gambrel 147 is connected to the cable 145 at its distal end. The gambrel 147 is normally latched to the trailer 110 such as on hooks 137 of the winch frame 130. When the platform 160 is in either its lowered position (FIGS. 1A and 1B) or its viewing position (FIG. 4), the gambrel 147 may be unhooked and then used to support a deer (not shown).

FIG. 6 provides an enlarged rear view of the rear of the trailer 110. As noted above, the two top pulleys 138*b* are more clearly seen in this view. The gambrel 147 and hooks 137 are also more clearly seen. Here, the gambrel 147 is in position to receive a deer for draining and skinning.

Other features and embodiments of the present invention will be within the spirit and scope of the claims, which follow.

I claim:

1. A selectively liftable platform mechanism, comprising:

a trailer;

a support structure on the trailer comprising:

a platform having a first end and a second opposite end, at least one linear support bar having a proximal end pivotally connected to the trailer, and a distal end pivotally connected to the platform proximate the first end of the platform there being no movable linkages between the two ends of the linear support bar, and a ladder having two side stiles and a plurality of rungs there-between, and a proximal end pivotally connected to and slidably movable along the trailer, and a distal end pivotally connected to the platform proximate the second opposite end of the platform, wherein the side stiles do not include any linkages between the two ends other than the rungs there-between, the ladder providing structural support for the platform when the platform is in a raised position above the trailer; and a stop member to limit longitudinal movement of the proximal end of the ladder so that the platform is in a substantially horizontal position once the proximal end of the ladder engages the stop member and the platform is in its raised position.

2. The platform mechanism of claim 1, further comprising an erection assembly for moving the platform from a lowered position to its raised position.

3. The platform mechanism of claim 2, wherein the erection assembly comprises:

a cable; and a winch for selectively applying tension to the cable so as to cause the at least one support bar to rotate the platform from a lowered position to its raised position.

4. The platform mechanism of claim 2, wherein:

the proximal end of the ladder comprises a transverse bar having opposing ends;

the trailer has a frame that extends along a longitudinal axis of the trailer that receives the opposing ends of the transverse bar of the ladder; and wherein the stop member attaches to the frame of the trailer.

5. The platform mechanism of claim 3, further comprising:

a winch frame connected to the trailer proximate a first end of the trailer, the winch frame having a horizontal rail and two vertical side bars; and wherein the winch is supported by one of the vertical side bars; and at least one pulley is placed on the horizontal rail for receiving the cable.

6. The platform mechanism of claim 5, wherein the cable:

has a first end connected to the winch;

is wound through the at least one pulley; and has a second end connected to a gambrel at the first end of the trailer.

7. The platform mechanism of claim 5, further comprising a ladder spring having a first end connected to the first end of the trailer, and a second end connected to the transverse bar of the ladder to bias the proximal end of the ladder towards the first end of the trailer.

8. The platform mechanism of claim 1, further comprising an erection assembly for moving the platform from a lowered position substantially horizontal and parallel to the trailer, then to an intermediate position above the trailer at an angle out of parallel, and then to a fully raised position in which the platform is substantially horizontal and parallel to the trailer.

* * * * *